United States Patent
Long

(10) Patent No.: US 12,035,411 B2
(45) Date of Patent: Jul. 9, 2024

(54) METHODS, NETWORK FUNCTION NODES AND COMPUTER READABLE MEDIA FOR EVENT SUBSCRIPTION MANAGEMENT

(71) Applicant: Telefonaktiebolaget LM Ericsson (publ), Stockholm (SE)

(72) Inventor: Hongxia Long, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/450,531

(22) Filed: Aug. 16, 2023

(65) Prior Publication Data
US 2023/0388776 A1    Nov. 30, 2023

Related U.S. Application Data

(63) Continuation of application No. 17/933,181, filed on Sep. 19, 2022, now abandoned, which is a (Continued)

(30) Foreign Application Priority Data

Nov. 16, 2018  (WO) ................ PCT/CN2018/116045

(51) Int. Cl.
*H04W 8/18*    (2009.01)
(52) U.S. Cl.
CPC ..................... *H04W 8/18* (2013.01)
(58) Field of Classification Search
CPC ....................................... H04W 8/18
See application file for complete search history.

(56) References Cited

U.S. PATENT DOCUMENTS

2010/0091965 A1   4/2010  Ma et al.
2012/0231828 A1   9/2012  Wang et al.
(Continued)

FOREIGN PATENT DOCUMENTS

CN      102340767 A     2/2012
CN      108401275 A     8/2018
(Continued)

OTHER PUBLICATIONS

3GPP TS 29.503 v15.1.0; Technical Specification; 3rd Generation Partnership Project; Technical Specification Group Core Network and Terminals; 5G System; Unified Data Management Services; Stage 3 (Release 15)—Sep. 2018.
(Continued)

*Primary Examiner* — Barry W Taylor
(74) *Attorney, Agent, or Firm* — Baker Botts L.L.P.

(57) ABSTRACT

The present disclosure provides methods for event subscription management in a network comprising a set of NF nodes, and corresponding NF nodes. The method comprises receiving a subscription request of an event for a user from an event subscriber, in response to receipt of the subscription request, transmitting, to a second network function node, a query request for querying whether the event for the user has been subscribed; and if a response to the query request from the second network function node indicates that the event for the user has been subscribed, transmitting, to the second network function node, an updating request for updating a subscriber list of the event for the user by the second network function node to include the event subscriber into the subscriber list. The present disclosure further discloses a corresponding method which comprises receiving a query request from a first network function node for querying whether an event for a user has been subscribed, in response to reception of the query request, checking whether an
(Continued)

indicator indicating the event for the user has been subscribed has been set, and transmitting a check result to the first network function node. The present disclosure further provides corresponding computer readable medium.

16 Claims, 11 Drawing Sheets

Related U.S. Application Data continuation of application No. 16/482,541, filed as application No. PCT/CN2019/091109 on Jun. 13, 2019, now Pat. No. 11,451,953.

(56) References Cited

U.S. PATENT DOCUMENTS

| | | | |
|---|---|---|---|
| 2018/0270778 | A1 | 9/2018 | Bharatia |
| 2019/0313468 | A1* | 10/2019 | Talebi Fard ........... H04W 60/04 |
| 2019/0394279 | A1 | 12/2019 | Dao et al. |
| 2020/0252837 | A1 | 8/2020 | Kim et al. |
| 2020/0404106 | A1 | 12/2020 | Belling |
| 2021/0274575 | A1* | 9/2021 | Talebi Fard ........... H04W 76/12 |
| 2021/0297536 | A1* | 9/2021 | Qiao ................. H04M 15/8033 |

FOREIGN PATENT DOCUMENTS

| | | | |
|---|---|---|---|
| CN | 108702723 | A | 10/2018 |
| CN | 108702724 | A | 10/2018 |

OTHER PUBLICATIONS

3GPP TS 29.505 v15.1.0; Technical Specification; 3rd Generation Partnership Project; Technical Specification Group Core Network and Terminals; 5G System; Usage of Unified Data Repository services for Subscription Data; Stage 3 (Release 15)—Sep. 2018.
PCT Notification of Transmittal of the International Search Report and the Written Opinion of the International Searching Authority, or the Declaration for International application No. PCT/CN2019/091109—dated Sep. 11, 2019.
3GPP TS 23.501 v0.3.0; Technical Specification; 3rd Generation Partnership Project; Technical Specification Group Services and System Aspects; System Architecture for the 5G System; Stage 2 (Release 15)—Feb. 2017.
SA WG2 Meeting #S2-129; Dongguan, P.R. China; Change Request; Title: Support for partial ciphering of initial NAS messages; Source to WG: Qualcomm Incorporated, Ericsson; Source to Tsg: Sa WG2 (S2-1811307, revision of S2-1810081)—Oct. 15-19, 2018.
3GPP TSG-RAN WG3 #99bis; Sanya, China; Source: LG Electronics Inc.; Title: UE AMBR in NG procedures (R3-182400)—Apr. 16-20, 2018.
3GPP TS 29.504 v15.1.0; Technical Specification; 3rd Generation Partnership Project; Technical Specification Group Core Network and Terminals; 5G System; Unified Data Repository Services; Stage 3 (Release 15)—Sep. 2018.
SA WG2 Meeting #S2-119; Dubrovnik, Croatia; Source: China Mobile; Title: Describe NF Services provided by UDM (S2-170907)—Feb. 13-17, 2017.
3GPP TSG CT4 Meeting #78; Zhangjiajie, P.R. China; Source: Nokia, Alcatel-Lucent Shanghai Bell; Title: Pseudo-CR on TR 29.891 Clause 6.7 (UDM procedures and services) (C4-173119)—May 15-19, 2017.
SA WG2 meeting #127; Sanya, China; Change Request; Title: Correction on capability negotiation on "SMS over NAS"; Source to WG: Samsung, LG Electronics; Source to TSG: S2 (S2-184445 (was S2-184278))—Apr. 16-20, 2018.
Partial Supplementary European Search Report issued for Application No. Patent No. 19741968.2-1212 / 3673674 PCT/CN2019091109—dated Dec. 4, 2020.
Extended European Search Report issued for Application No./Patent No. 19741968.2-1212 / 3673674 PCT/CN2019091109—dated Mar. 9, 2021.
3GPP TS 23.502 V15.2.0 (Jun. 2018); 3rd Generation Partnership Project; Technical Specification Group Services and System Aspects; Procedures for the 5G System; Stage 2 (Release 15).
PCT Notification of Transmittal of International Preliminary Report on Patentability issued for International application No. PCT/CN2019/091109—dated Mar. 19, 2021.
EPO Communication Pursuant to Article 94(3) EPC issued for Application No. 19 741 968.2-1216—dated Feb. 6, 2023.
Official Action issued for Chinese Patent Application No. 201980072695.5—dated Nov. 3, 2023.

\* cited by examiner

METHODS, NETWORK FUNCTION NODES AND COMPUTER READABLE MEDIA FOR EVENT SUBSCRIPTION MANAGEMENT

PRIORITY

This nonprovisional application is a continuation, under 35 U.S.C. § 120, of U.S. patent application Ser. No. 17/933,181 filed on Sep. 19, 2022, which is a continuation application, under 35 U.S.C. § 120, of U.S. patent application Ser. No. 16/482,541 filed on Jul. 31, 2019, now U.S. Pat. No. 11,451,953, which is a U.S. National Stage Filing under 35 U.S.C. § 371 of International Patent Application Serial No. PCT/CN2019/091109 filed Jun. 13, 2019 and entitled "METHODS, NETWORK FUNCTION NODES AND COMPUTER READABLE MEDIA FOR EVENT SUBSCRIPTION MANAGEMENT" which claims priority to International Patent Application No. PCT/CN2018/116045 filed Nov. 16, 2018, each of which is hereby incorporated by reference in its entirety.

TECHNICAL FIELD

The present disclosure generally relates to the technical field of telecommunication, and particularly to methods and Network Function (NF) nodes for event subscription management in a network comprising a set of NF nodes and corresponding computer readable media.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Fifth Generation (5G) networks, a Network Slice is introduced as a logical network that provides specific network capabilities and network characteristics. An instance of a network slice (e.g. a network slice instance, NSI) is a set of Network Function (NF) instances and the required resources (e.g., compute, storage, and networking resources) which form a deployed Network Slice. An NF is a 3GPP adopted or 3GPP defined processing function in a network, which has defined functional behavior and 3GPP defined interfaces. An NF can be implemented either as a network element on dedicated hardware, a software instance running on a dedicated hardware, or as a virtualized functional instantiated on an appropriate platform, e.g., on a cloud infrastructure.

Among the NFs, a UDM (Unified Data Management) is defined, which functions to manage subscription from other NFs in the network. As per service definition in 3GPP 29.502, the following service has been defined:

Nudm_EventExposure: this service allows NF consumers to subscribe to receive an event, and provide monitoring indication of the event to the subscribed NF consumers.

For a 5G system to be deployed, it is common that there are multiple UDM instances providing same services.

It can be seen so far, only standalone event subscription management is defined, which is inefficient when there are multiple NF instances providing same services and might even cause an error.

SUMMARY

At least some objects of the present disclosure are to provide technical solutions capable of improving efficiency of event subscription when there are multiple NF instances providing same services.

According to one aspect of the present disclosure, there is provided a method implemented at a first network function node for managing event subscription. The method comprises receiving a subscription request of an event for a user from an event subscriber, in response to receipt of the subscription request, transmitting, to a second network function node, a query request for querying whether the event for the user has been subscribed; and if a response to the query request from the second network function node indicates that the event for the user has been subscribed, transmitting, to the second network function node, an updating request for updating a subscriber list of the event for the user by the second network function node to include the event subscriber into the subscriber list.

In an exemplary embodiment, if the response to the query request indicates that the event for the user has not been subscribed, the method further comprises initiating subscription of the event for the user with a serving node and transmitting a creating request with identification information of the event subscriber for creating the subscriber list for the event of the user and including the event subscriber in the created subscriber list by the second network node.

In an exemplary embodiment, the first network function node is one of a Unified Data Management (UDM), a Network Exposure Function (NEF), and an Access and Mobility Management Function (AMF).

In an exemplary embodiment, the second network function node is a Unified Data Repository (UDR).

According to another aspect of the present disclosure, there is provided a method implemented at a second network function node for managing event subscription. The method comprises receiving a query request from a first network function node for querying whether an event for a user has been subscribed, in response to reception of the query request, checking whether an indicator indicating the event for the user has been subscribed has been set, and transmitting a check result to the first network function node.

In an exemplary embodiment, the method further comprises receiving an updating request for updating a subscriber list of the event for the user with an event subscriber to the event from the first network function node, and in response to reception of the updating request, updating a subscriber list of the event for the user to include the event subscriber.

In an exemplary embodiment, the method further comprises receiving a creating request with identification information of the event subscriber to subscribe the event for the user from the first network function node, in response to reception of the creating request, setting the indicator, and creating the subscriber list of the event for the user and including the event subscriber into the subscriber list of the event for the user.

In an exemplary embodiment, the indicator is set in a table stored in the second network function node that describes event subscription of the user.

In an exemplary embodiment, the subscriber list is created in a table stored in the second network function node that describes subscription of the event for the user.

In an exemplary embodiment, the first network function node is one of a Unified Data Management (UDM), a Network Exposure Function (NEF), and an Access and Mobility Management Function (AMF).

In an exemplary embodiment, the second network function node is a Unified Data Repository (UDR).

According to another aspect of the present disclosure, there is provided a method implemented at a first network function node for managing event un-subscription. The method comprises receiving an un-subscription request of an event for a user from an event subscriber to un-subscribe the event, in response to reception of the un-subscription request, transmitting, to a second network function node, a query request for querying whether the event subscriber is a last subscriber for the event of the user in a subscriber list of the event for the user, and if a response to the query request from the second network function node indicates that the event subscriber is not the last subscriber for the event of the user, transmitting a removing request to the second network function node, for removing, by the second network function node, the event subscriber from the subscriber list of the event for the user.

In an exemplary embodiment, the removing request includes identification information of the event subscriber.

In an exemplary embodiment, if the response to the query request indicates that the event subscriber is the last subscriber for the event of the user, the method further comprises transmitting an event removing request to the second network function node for removing the subscriber list by the second network function node; and initiating un-subscription of the event for the user with a serving node.

According to another aspect of the present disclosure, there is provided a method implemented at a second network function node for managing event un-subscription. The method comprises receiving a query request for an event subscriber to un-subscribe an event for a user, from a first network function node for querying whether the event subscriber is a last subscriber for the event of the user in a subscriber list of the event for the user, in response to reception of the query request, checking whether the event subscriber is the last subscriber in the subscriber list of the event for the user, and transmitting a check result to the first network function node.

In an exemplary embodiment, the method further comprises receiving a removing request from the first network function node for removing the event subscriber from the subscriber list of the event for the user, and in response to reception of the removing request, removing the event subscriber from the subscriber list of the event for the user.

In an exemplary embodiment, the removing request includes identification information of the event subscriber to un-subscribe the event.

In an exemplary embodiment, the method further comprises receiving an event removing request for removing the subscriber list from the first network function node, and in response to reception of the event removing request, removing the subscriber list of the event for the user.

In an exemplary embodiment, the method further comprises removing an indicator indicating the event of the user has been subscribed.

In an exemplary embodiment, the removing the subscriber list comprises removing the subscriber list from a table stored in the second network function node that describes subscription of the event for the user.

In an exemplary embodiment, the removing the indicator comprises removing the indicator from a table stored in the second network function node that describes event subscription of the user.

According to another aspect of the present disclosure, a first NF node is provided, comprising: a communication interface arranged for communication, at least one processor, and a memory comprising instructions which, when executed by the at least one processor, cause the first NF node to receive a subscription request of an event for a user from an event subscriber, in response to receipt of the subscription request, transmit, to a second network function node, a query request for querying whether the event for the user has been subscribed; and if a response to the query request from the second network function node indicates that the event for the user has been subscribed, transmit, to the second network function node, an updating request for updating a subscriber list of the event for the user by the second network function node to include the event subscriber into the subscriber list.

According to another aspect of the present disclosure, a second NF node is provided, comprising: a communication interface arranged for communication, at least one processor, and a memory comprising instructions which, when executed by the at least one processor, cause the second NF node to receive a query request from a first network function node for querying whether an event for a user has been subscribed, in response to reception of the query request, check whether an indicator indicating the event for the user has been subscribed has been set, and transmit a check result to the first network function node.

According to another aspect of the present disclosure, a first NF node is provided, comprising: a communication interface arranged for communication, at least one processor, and a memory comprising instructions which, when executed by the at least one processor, cause the first NF node to receive an un-subscription request of an event for a user from an event subscriber, in response to reception of the un-subscription request, transmit, to a second network function node, a query request for querying whether the event subscriber is a last subscriber for the event of the user in a subscriber list of the event for the user; and if a response to the query request from the second network function node indicates that the event subscriber is not the last subscriber for the event of the user, transmit a removing request to the second network function node, for removing, by the second network function node, the event subscriber from the subscriber list of the event for the user.

According to another aspect of the present disclosure, a second NF node is provided, comprising: a communication interface arranged for communication, at least one processor, and a memory comprising instructions which, when executed by the at least one processor, cause the second NF node to receive a query request for an event subscriber to un-subscribe an event for a user, from a first network function node for querying whether the event subscriber is a last subscriber for the event of the user in a subscriber list of the event for the user, in response to reception of the query request, check whether the event subscriber is the last subscriber in the subscriber list of the event for the user, and transmit a check result to the first network function node.

According to another aspect of the present disclosure, a computer readable medium which stores computer program comprising instructions which, when executed on at least one processor, cause the at least one processor to perform the methods for event subscription management as discussed previously.

According to the above technical solutions of the present disclosure, on one hand, when a subscription for an event of a user is raised from an event subscriber, it firstly checks whether the event of the user has been subscribed. If the event of the user has not been subscribed, a subscription process is initiated. If the event of the user has been subscribed previously and has not been un-subscribed yet, the event subscriber is added in a subscriber list and no subscription process will be initiated. Accordingly, redundant subscription process for the same event of the same user will be avoided. On the other hand, when a un-subscription for an event of a user is raised from an event subscriber, it firstly checks whether the event subscriber is the last subscriber for the event of the user. If it is, a un-subscription process is initiated. If the event subscriber is not the last subscriber for the event of the user, the event subscriber is removed from the subscriber list and no un-subscription process will be initiated. Accordingly, the un-subscription from one event subscriber will not affect the other event subscribers that are interested in the event of the user.

BRIEF DESCRIPTION OF THE DRAWINGS

The objects, advantages and characteristics of the present disclosure will be more apparent, according to descriptions of preferred embodiments in connection with the drawings, on which.

Figure 1:
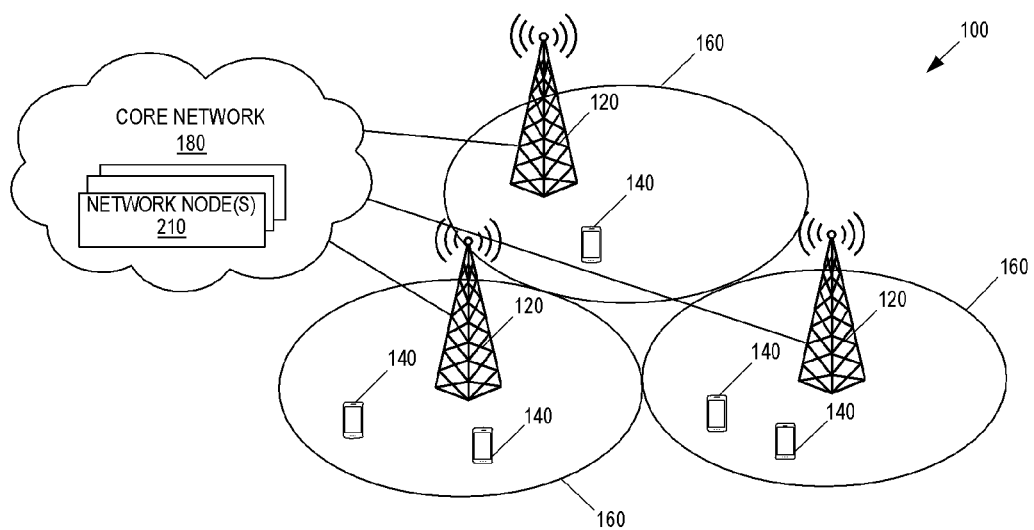
FIG. 1 illustrates one example of a wireless communication system in which embodiments of the present disclosure may be implemented.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in references as follows:

1) 3GPP 23.501, V15.3.0, (2018 September)
2) 3GPP 23.502, V15.3.0 (2018 September)
3) 3GPP 29.503, V15.1.0 (2018 September), and
4) 3GPP 29.505, V15.1.0 (2018 September).

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE) and other networks developed in the future. The terms "network" and "system" are sometimes used interchangeably. For illustration only, certain aspects of the techniques are described below for the next, i.e. the $5^{th}$ generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

FIG. 1 illustrates one example of a wireless communication system 100 in which embodiments of the present disclosure may be implemented. The wireless communication system 100 may be a cellular communications system such as, for example, a 5G New Radio (NR) network or an LTE cellular communications system. As illustrated, in this example, the wireless communication system 100 includes a plurality of radio access nodes 120 (e.g., evolved Node B:s (eNBs), 5G base stations which are referred to as gNBs, or other base stations or similar) and a plurality of wireless communication devices 140 (e.g., conventional UEs, Machine Type Communication (MTC/Machine-to-Machine (M2M) UEs). The wireless communication system 100 is organized into cells 160, which are connected to a core network 180 via the corresponding radio access nodes 120. The radio access nodes 120 are capable of communicating with the wireless communication devices 140 (also referred to herein as communication device 140 or UEs 140) along with any additional elements suitable to support communication between wireless communication devices or between a wireless communication device and another communication device (such as a landline telephone). The core network 180 includes one or more network node(s) or function(s) 210. In some embodiments, the network nodes/functions 210 may comprise, for example, any of the network functions shown in FIGS. 2-3.

Figure 2:
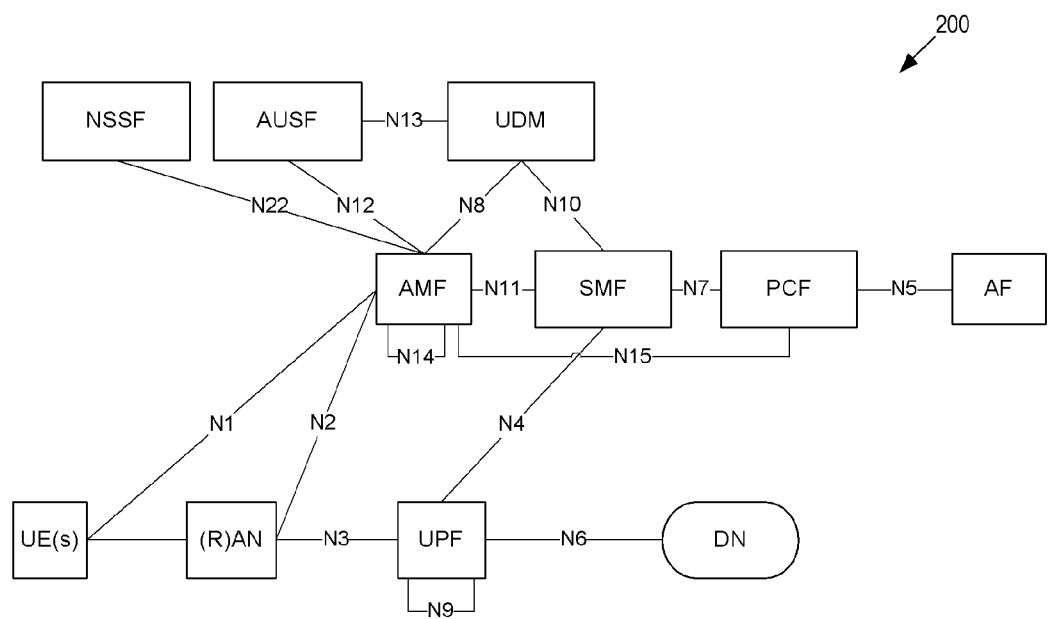
FIG. 2 illustrates a wireless communication system represented as a 5G network architecture composed of core NFs.

FIG. 2 illustrates a wireless communication system 200 represented as a 5G network architecture composed of core NFs, where interaction between any two NFs is represented by a point-to-point reference point/interface.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

Reference point representations of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMP, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as a service so that its reuse is possible. This service enables support for modularity. The user plane supports interactions such as forwarding operations between different UPFs.

Figure 3:
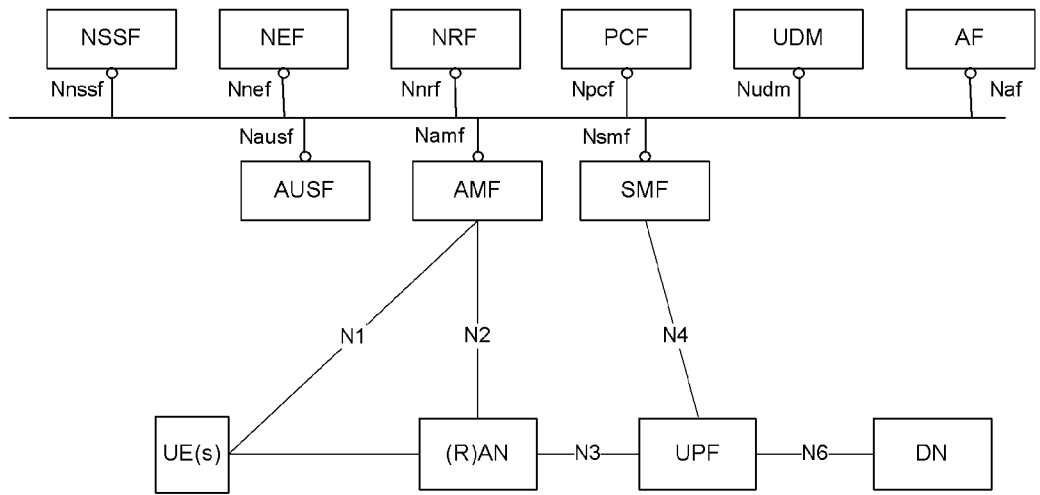
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The Network Exposure Function (NEF) and the Network Function Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2-3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

Figure 4:
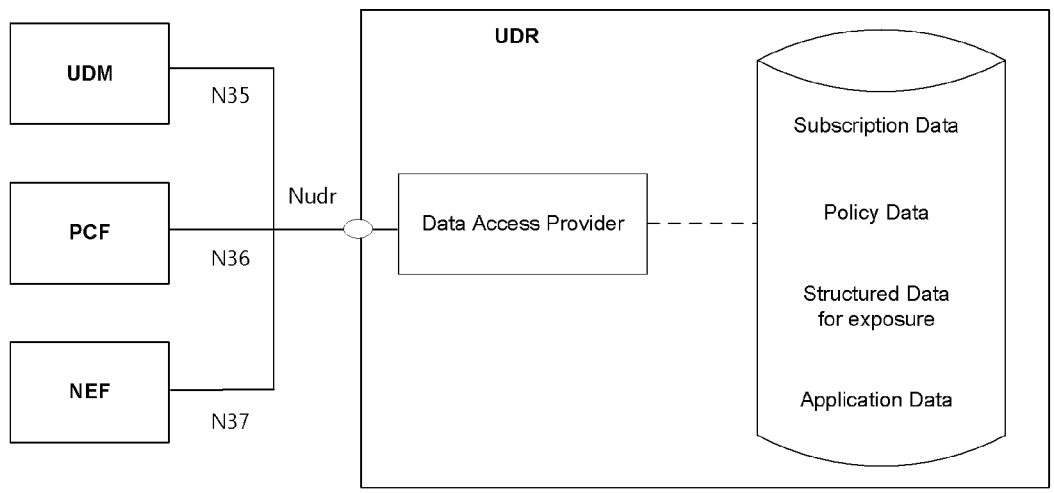
FIG. 4 illustrates a data storage architecture in a 5G network.

FIG. 4 illustrates a data storage architecture in a 5G network. There can be multiple UDRs (Unified Data Repository) deployed in the network, each of which can accommodate different data sets or subsets (e.g. subscription data, subscription policy data, data for exposure, application data) and/or serve different sets of NFs. Deployments where a UDR serves a single NF and stores its data, and, thus, can be integrated with this NF, may be possible.

The Nudr interface is defined for the network functions (i.e. NF Service Consumers), such as UDM, PCF and NEF, to access a particular set of the data stored and to read, update (including add, modify), delete, and subscribe to notification of relevant data changes in the UDR.

Each NF Service Consumer accessing the UDR, via Nudr, shall be able to add, modify, update or delete only the data it is authorized to change. This authorization shall be performed by the UDR on a per data set and NF service consumer basis and potentially on a per UE, subscription granularity.

An NF may be implemented either as a network element on a dedicated hardware, as a software instance running on a dedicated hardware, or as a virtualized function instantiated on an appropriate platform, e.g., a cloud infrastructure.

As 3GPP 29.503 defined, for the Nudm_EventExposure service the following service operations are defined:
Subscribe
Unsubscribe
Notify The Nudm_EventExposure service is used by consumer NFs (e.g. NEF) to subscribe to notifications of event occurrence by means of the Subscribe service operation. For events that can be detected by the AMF, the UDM makes use of the appropriate AMF service operation to subscribe on behalf of the consumer NF (e.g. NEF).

The Nudm_EventExposure service is also used by the consumer NFs (e.g. NEF) that have previously subscribed to notifications, to unsubscribe by means of the Unsubscribe service operation. For events that can be detected by the AMF, the UDM makes use of the appropriate AMF service operation to unsubscribe on behalf of the consumer NF (e.g. NEF).

The Nudm_EventExposure service is also used by the subscribed consumer NFs (e.g. NEF) to get notified by the UDM when a subscribed event occurs at the UDM by means of the Notify service operation. For subscribed events that can occur at the AMF, the consumer NF (e.g. NEF) makes use of the corresponding AMF service operation to get notified by the AMF directly without UDM involvement.

For the related AMF context data model (shared by UDR), it is defined in the following table (defined in 3GPP 29.503).

TABLE 1

Definition of type Amf3GppAccessRegistration

| Attribute name | Data type | P | Cardinality | Description |
| --- | --- | --- | --- | --- |
| amfInstanceId | NfInstanceId | M | 1 | The identity the AMF uses to register in the NRF. |
| supportedFeatures | SupportedFeatures | O | 0 . . . 1 | See subclause 6.2.8 |
| purgeFlag | PurgeFlag | O | 0 . . . 1 | This flag indicates whether or not the AMF has deregistered. It shall not be included in the Registration service operation. |
| pei | Pei | O | 0 . . . 1 | Permanent Equipment Identifier. |
| imsVoPS | ImsVoPS | O | 0 . . . 1 | Indicates per UE if "IMS Voice over PS Sessions" is homogeneously supported in all TAs in the serving AMF, or homogeneously not supported, or if support is non-homogeneous/unknown. Absence of this attribute shall be interpreted as "non homogenous or unknown" support. |
| deregCallbackUri | Uri | M | 1 | A URI provided by the AMF to receive (implicitly subscribed) notifications on deregistration. |
| pcscfRestorationCallbackUri | Uri | O | 0 . . . 1 | A URI provided by the AMF to receive (implicitly subscribed) notifications on the need for P-CSCF Restoration. |
| guami | Guami | C | 0 . . . 1 | This IE shall contain the serving AMF's GUAMI. It shall be included if the NF service consumer is an AMF. |
| backupAmfInfo | array(BackupAmfInfo) | C | 0 . . . N | This IE shall be included if the NF service consumer is an AMF and the AMF supports the AMF management without UDSF for the first interaction with UDM. The UDM uses this attribute to do an NRF query in order to invoke later services in a backup AMF, e.g. Namf_EventExposure. |

Optional attributes of this type that are also attributes of the derived type Amf3GppAccessRegistrationModification (see clause 6.2.6.2.7) shall not be marked with "nullable: true" in the OpenAPI file.

For the related event subscription data models (shared by UDR), they are defined in following 3 tables (defined in 3GPP 29.503):

TABLE 2

Definition of type EeSubscription

| Attribute name | Data type | P | Cardinality | Description |
|---|---|---|---|---|
| callbackReference | Uri | M | 1 | URI provided by the NF service consumer to receive notifications |
| monitoringConfiguration | map(MonitoringConfiguration) | M | 1...N | A map (list of key-value pairs where referenceId converted from integer to string serves as key) of MonitoringConfigurations; see subclause 6.4.6.2.3 |
| reportingOptions | ReportingOptions | O | 0...1 | This IE may be included if the NF service consumer wants to describe how the reports of the event to be generated. |
| supportedFeatures | SupportedFeatures | O | 0...1 | See subclause 6.4.8 |

TABLE 3

Definition of type MonitoringConfiguration

| Attribute name | Data type | P | Cardinality | Description |
|---|---|---|---|---|
| referenceId | ReferenceId | M | 1 | Reference Id uniquely identifies the Monitoring Configuration |
| eventType | EventType | M | 1 | String; see subclause 6.4.6.3.3 |
| immediateFlag | boolean | O | 0...1 | Indicates if an immediate event report in the subscription response indicating current value/status of the event is required or not. If the flag is not present then immediate reporting shall not be done. |

TABLE 4

Enumeration EventType

| Enumeration value | Description |
|---|---|
| "LOSS_OF_CONNECTIVITY" | Loss of connectivity |
| "UE_REACHABILITY_FOR_DATA" | UE reachability for data |
| "UE_REACHABILITY_FOR_SMS" | UE reachability for SMS |
| "LOCATION_REPORTING" | Location Reporting |
| "CHANGE_OF_SUPI_PEI_ASSOCIATION" | Change of SUPI-PEI association |
| "ROAMING_STATUS" | Roaming Status |
| "COMMUNICATION_FAILURE" | Communication Failure |
| "AVAILABILITY_AFTER_DNN_FAILURE" | Availability after DNN failure |

For the related created event subscription data model (shared by UDR), it is defined in following table (defined in 3GPP 29.503):

TABLE 5

Definition of type CreatedEeSubscription

| Attribute name | Data type | P | Cardinality | Description |
|---|---|---|---|---|
| eeSubscription | EeSubscription | M | 1 | This IE shall contain the representation of the created event subscription. |
| numberOfUes | Uinteger | C | 0...1 | This IE shall be included if the event subscription is for a group of UEs. When present, this IE shall represent the number of UEs in the group. |
| eventtReports | array(MonitoringReport) | O | 0...N | This IE when present, shall contain the status of events that are requested for immediate reporting as well, if those events are available at the time of subscription. |

It is obvious that there are events which are commonly interested by multiple NFs, such as the UE reachability for SMS event, but such common events are not managed efficiently. Currently only standalone event subscription management is defined. When there are multiple NFs who are interested on the same event, for example the reachability for SMS for the same user, the standalone event management is not efficient or even worse it is erroneous.

Hereinafter, a method for event subscription management in a network comprising a set of NF nodes according to an exemplary embodiment of the present disclosure will be described with reference to FIGS. 5 and 6.

Figure 5:
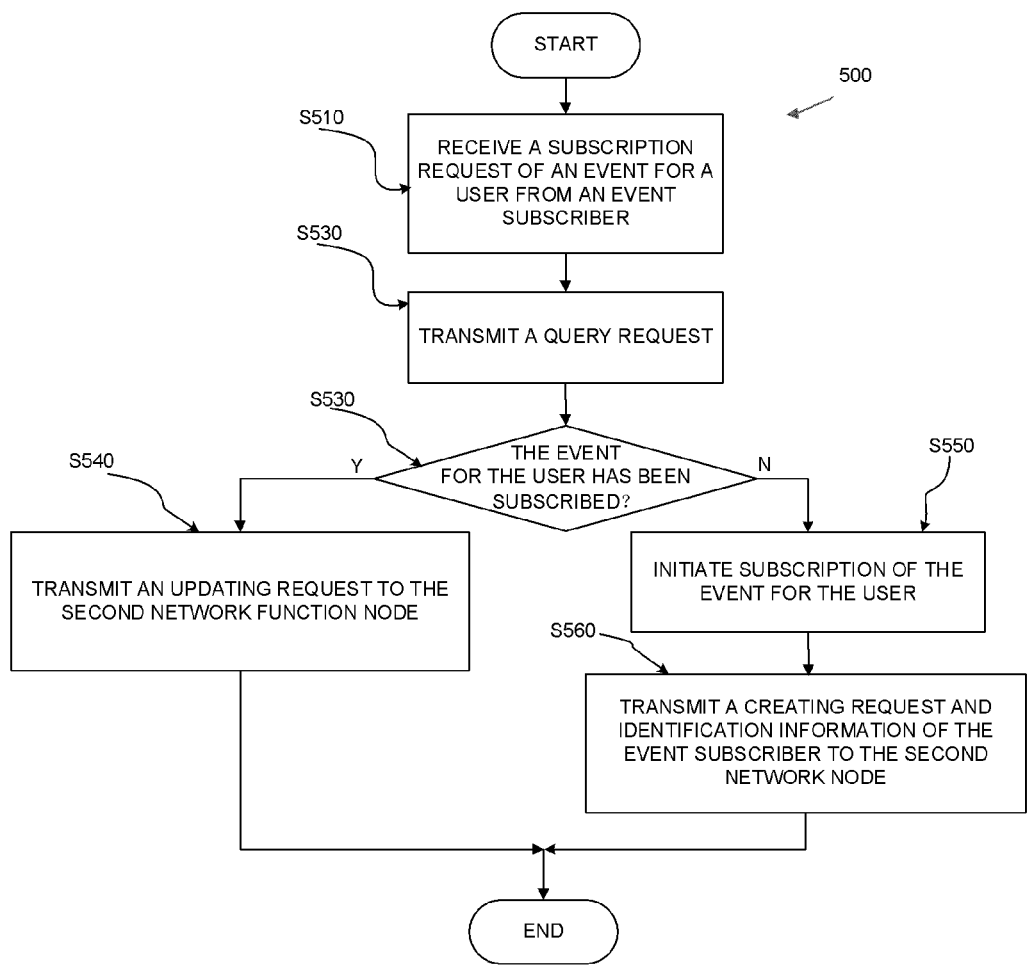
FIG. 5 illustratively shows a flowchart of a method for managing event subscription according to an exemplary embodiment of the present disclosure.

FIG. 5 illustratively shows a flowchart of a method 500 for managing event subscription according to an exemplary embodiment of the present disclosure. In an embodiment, the method 500 may be performed at a first network function node.

As shown in FIG. 5, the method 500 may include Steps S510-S530.

In Step S510, a subscription request of an event for a user is received from an event subscriber. In response to the receipt of the subscription request, the method proceeds to step S520, in which the first network function node transmits, to a second network function node, a query request for querying whether the event for the user has been subscribed. The first network function node receives a response to the query request from the second network function node at step S530. An example of Step S510, S520 and S530 is Step S702, S704 and S708 shown in FIG. 7.

If the response to the query request from the second network function node indicates that the event for the user has been subscribed, the method proceeds to step S540, in which the first network function node transmits, to the second network function node, an updating request for updating a subscriber list of the event for the user by the second network function node to include the event subscriber into the subscriber list. The updating request may include identification information of the event subscriber. An example of Step S540 is Step S726 shown in FIG. 7.

If the response to the query request from the second network function node indicates that the event for the user has not been subscribed, the method proceeds to step S550, in which the first network function node initiates subscription of the event for the user with a serving node, and in step S560, the first network function nodes transmits a creating request with identification information of the event subscriber for creating the subscriber list for the event of the user and including the event subscriber in the created subscriber list by the second network node. An example of Step S550, S560 is Step S710 and S714 shown in FIG. 7.

Please note that the terms "updating request" and "creating request" as used above are named for differentiating the two requests but not for limiting the meaning or scope of the description reciting these terms.

In an exemplary embodiment of the present disclosure, the first network function node may be one of a Unified Data Management (UDM), a Network Exposure Function (NEF), and an Access and Mobility Management Function (AMF).

In an exemplary embodiment of the present disclosure, the second network function node is a Unified Data Repository (UDR).

According to the embodiment of the present disclosure, the first network function node, when receiving a subscription request of an event for a user, checks with the second network function node whether there is already subscription for the event of the user. If there is no such subscription, the first network function node will transmit a request, for example a creating request, with identification information of the event subscriber to the second network function node, which will record the subscription of the event for the user. The first network function node will then initiate the subscription of the event. For example, the first network function node may determine which network function node in the network to perform the event monitoring, i.e., the serving node, and then transmit the subscription request to the serving node to perform the event. Thereafter, when the first network function node receives a subscription request for the same event of the same user, after checking with the second network function node, the first network function node knows that there is already subscription for the event of the user. The first network function node will then transmit a request, for example an updating request to the second network function node, which will record the event subscriber as a subscriber for the event of the user. The request may include identification information of the event subscriber. At this time, the first network function node will not initiate the subscription of the event to the serving node again because the event has been subscribed. The event subscriber will be provided with a notification of the event because it has been added in the subscriber list for the event. According to the embodiment of the present disclosure, un-necessary duplicated subscription towards the serving node can be avoided.

Figure 6:
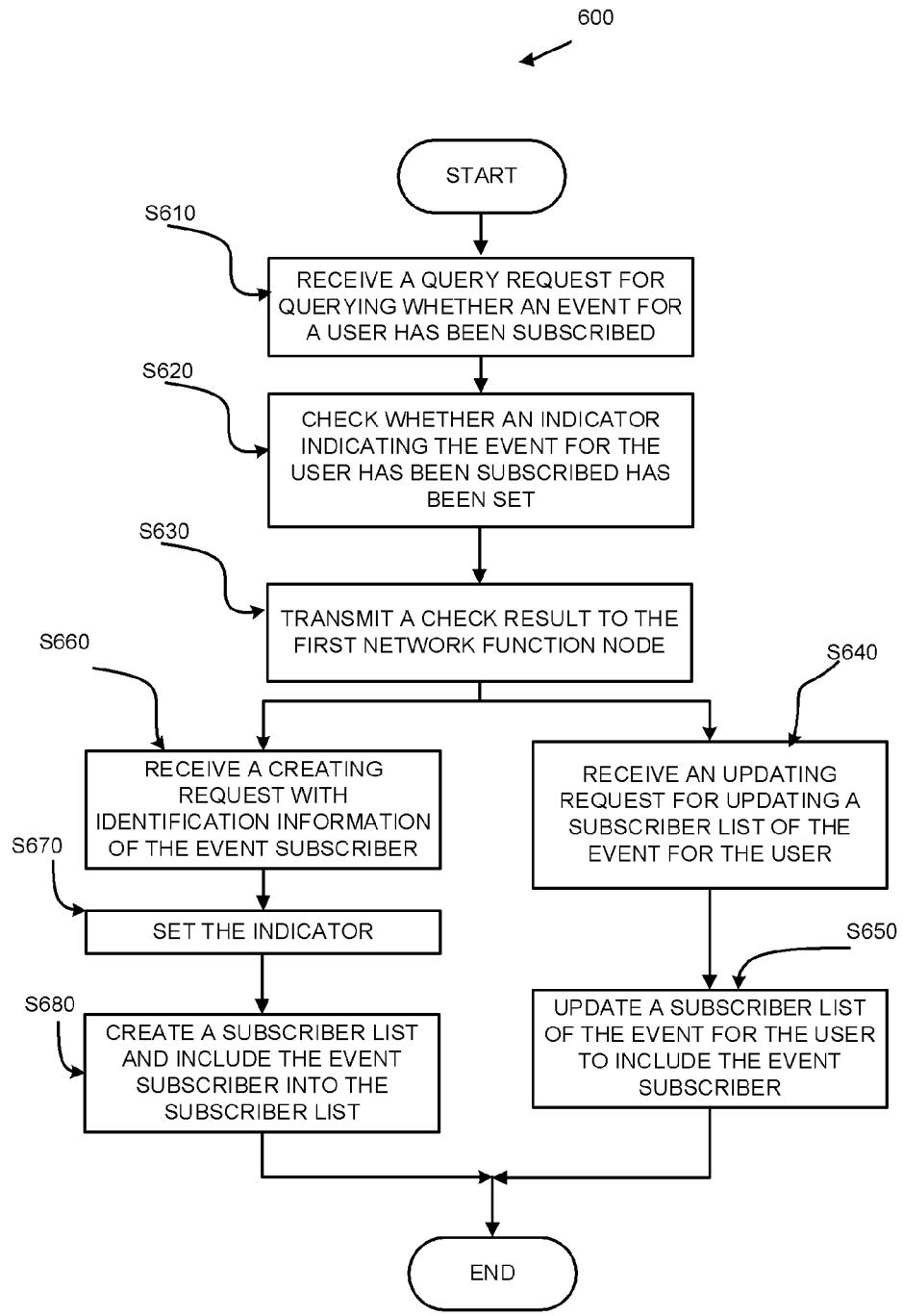
FIG. 6 illustratively shows a flowchart of a method for managing event subscription according to an exemplary embodiment of the present disclosure.

FIG. 6 illustratively shows a flowchart of a method 600 for managing event subscription according to an exemplary embodiment of the present disclosure. In an embodiment, the method 600 may be performed at a second network function node.

As shown in FIG. 6, the method 600 may include Steps S610-S630.

In Step S610, the second network function node receives a query request from a first network function node for querying whether an event for a user has been subscribed. In response to reception of the query request, the method proceeds to step S620, in which the second network function node checks whether an indicator indicating the event for the user has been subscribed has been set. Then, the method proceeds to step S630, in which the second network function node transmits a check result to the first network function node. An example of Step S610, S620 and S630 is Step S704, S706 and S708 shown in FIG. 7.

In response to the transmission of the check result to the first network function node, the method 600 may also include Step S640, in which the second network function node may receive, from the first network function node, an updating request for updating a subscriber list of the event for the user with an event subscriber to the event. The updating request may include identification information of the event subscriber. In response to reception of the updating request, the method proceeds to step S650, in which the second network function node updates a subscriber list of the event for the user to include the event subscriber. An example of Step S640 and S650 is Step S726 and S728 shown in FIG. 7.

The method 600 may also include step S660, in which the second network function node may receive, from the first network function node, a creating request with identification information of the event subscriber to subscribe the event for the user. In response to reception of the creating request, the method proceeds to step S670, in which the second network function node sets the indicator. In step S680, the second network function node creates the subscriber list of the event for the user and includes the event subscriber into the subscriber list of the event for the user. An example of Step S660, S670 and S680 is Step S714 and S716 shown in FIG. 7. Please note that the steps in FIG. 6 are exemplified in the order as shown. Some steps such as S670 and S680 may be performed in a different order, e.g. in parallel or in a reverse order.

In an exemplary embodiment of the present disclosure, the indicator is set in a table stored in the second network function node that describes event subscription of the user.

In an exemplary embodiment of the present disclosure, the subscriber list is created in a table stored in the second network function node that describes subscription of the event for the user.

In an exemplary embodiment of the present disclosure, the first network function node is one of a Unified Data Management (UDM), a Network Exposure Function (NEF), and an Access and Mobility Management Function (AMF).

In an exemplary embodiment of the present disclosure, the second network function node is a Unified Data Repository (UDR).

According to the embodiment of the present disclosure, the second network function node, when receiving a query request from a first network function node for querying whether an event for a user has been subscribed, determines whether there is already subscription for the event of the user by checking whether an indicator indicating the event for the user has been subscribed has been set. The second network function transmits its check result to the first network function node. If the indicator has not been set, the second network function node knows that there is no subscription for the event of the user and will send the check result to the first network function node indicating that the event for that user has not been subscribed. Accordingly, the first network function node will transmit a request, for example a creating request, with identification information of the event subscriber to the second network function node. Upon receiving the creating request, the second network function node sets the indicator and creates a subscriber list of the event for the user and includes the event subscriber into the subscriber list of the event for the user. Thereafter, when the second network function node receives a query request for querying whether the event for the user has been subscribed, it determines that there is already subscription for the event of the user with the set indicator and will indicate, e.g. with a check result, to the first network function node that the event for the user has been subscribed. The first network function node thereby knows that there is already subscription for the event of the user. The first network function node will then transmit a request, for example an updating request to the second network function node. The request may include identification information of the event subscriber. Upon receiving the updating request, the second network function node updates the subscriber list of the event for the user to include the event subscriber. According to the embodiment of the present disclosure, an indicator is introduced to indicate whether an event for a user has been subscribed or not, and a subscriber list is introduced to maintain a list of subscribers for the same event of the user. By looking into the indicator, it is known whether the event has been subscribed, and thus un-necessary duplicated subscription to the serving node can be avoided.

Figure 7:
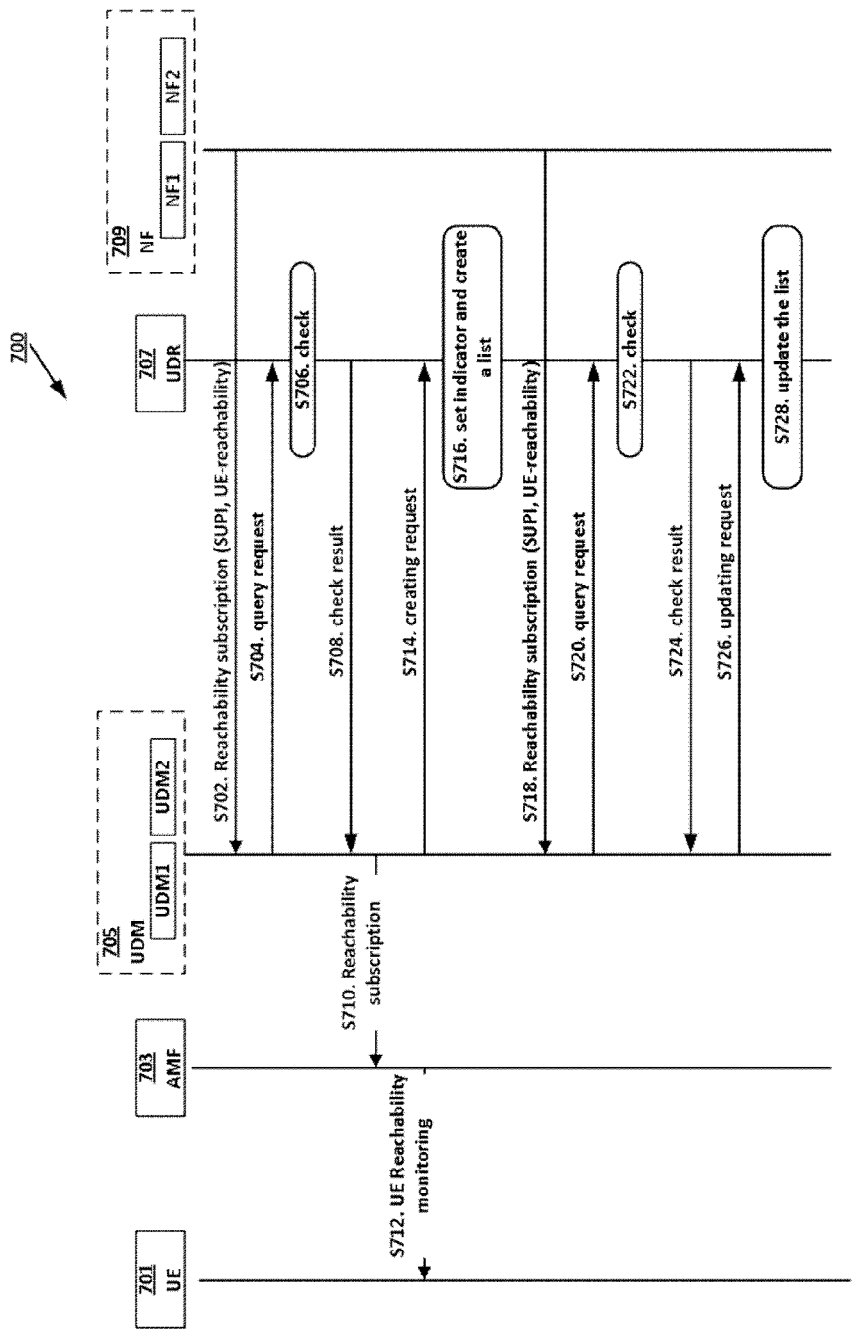
FIG. 7 shows an exemplifying signaling diagram illustrating details of the methods schematically illustrated in FIGS. 5 and 6.

FIG. 7 shows an exemplifying signaling diagram 700 illustrating details of the methods schematically illustrated in FIGS. 5 and 6.

The example shown in FIG. 7 involves a UE 701, an AMF 703, a list of UDMs 705, a UDR 707 and a list of NFs 709. It is shown that the list of UDMs 705 includes two UDM instances, UDM1 and UDM2, and the list of NF 709 includes two NF instances, NF1 and NF2. It is only an example and the present disclosure is not limited thereto.

When NF1 initiates UE reachability subscription for a certain user (Subscriber Permanent Identity (SUPI)=xxx), one of UDM instance such as UDM1 is selected based on load balancing rules. UDM1 receives the reachability subscription from NF1 (S702).

UDM1 transmits a query request to UDR 707 (S704) for querying whether the event for the user has been subscribed.

UDR 707 then checks whether the event for the user has been subscribed (S706). In the example, it is assumed that the event for the user has not been subscribed.

UDR 707 then transmits its check result to UDM1 (S708).

Upon receiving the response from UDR 707 indicating the event for the user has not been subscribed, UDM1 then initiates the reachability subscription to the serving node, in this case it is AMF 703 (S710). AMF 703 starts monitoring of UE reachability (S712).

Upon reception of acknowledgement that the reachability subscription is successful, UDM1 transmits a creating request to UDR 707 (S714) along with identity of NF1, which is the event subscriber.

Upon receiving the creating request, UDR 707 sets UE reachability subscription indicator (e.g., =true) for the user and creates a subscriber list to include NF1 (S716).

When NF2 initiates UE reachability subscription for the same user (SUPI=xxx), one of UDM instance such as UDM2 may be selected based on load balancing rules. UDM2 receives the reachability subscription from NF2 (S718).

UDM2 transmits a query request to UDR 707 (S720) for querying whether the event for the user has been subscribed.

UDR 707 then checks whether the event for the user has been subscribed (S722). At the time, UDR 707 finds that the UE reachability subscription indicator is set to be true, and then transmits the check result indicating the event has been subscribed to UDM2 (S724).

UDM2 then knows that the reachability event for the same user has been subscribed before, and then transmits an updating request to UDR 707 (S726).

Upon receiving the updating request, UDR 707 updates the subscriber list to include NF2 (S728).

At the time, UDM 705 will not initiate the reachability subscription to AMF. Therefore, un-necessary duplicated un-necessary reachability subscription towards the serving node can be avoided.

The UE reachability subscription indicator can be added in for example, Amf3GppAccessRegistration. Below is an example of the Amf3GppAccessRegistration modified according to the present disclosure, where the field in bold is an example of UE reachability subscription indicator.

TABLE 6

Definition of type Amf3GppAccessRegistration

| Attribute name | Data type | P | Cardinality | Description |
|---|---|---|---|---|
| amfInstanceId | NfInstanceId | M | 1 | The identity the AMF uses to register in the NRF. |
| supportedFeatures | SupportedFeatures | O | 0 . . . 1 | See subclause 6.2.8 |
| purgeFlag | PurgeFlag | O | 0 . . . 1 | This flag indicates whether or not the AMF has deregistered. It shall not be included in the Registration service operation. |
| pei | Pei | O | 0 . . . 1 | Permanent Equipment Identifier. |
| imsVoPS | ImsVoPS | O | 0 . . . 1 | Indicates per UE if "IMS Voice over PS Sessions" is homogeneously supported in all TAs in the serving AMF, or homogeneously not supported, or if support is non-homogeneous/unknown. Absence of this attribute shall be interpreted as "non homogenous or unknown" support. |
| deregCallbackUri | Uri | M | 1 | A URI provided by the AMF to receive (implicitly subscribed) notifications on deregistration. |
| pcscfRestorationCallbackUri | Uri | O | 0 . . . 1 | A URI provided by the AMF to receive (implicitly subscribed) notifications on the need for P-CSCF Restoration. |
| guami | Guami | C | 0 . . . 1 | This IE shall contain the serving AMF's GUAMI. It shall be included if the NF service consumer is an AMF. |
| backupAmfInfo | array(BackupAmfInfo) | C | 0 . . . N | This IE shall be included if the NF service consumer is an AMF and the AMF supports the AMF management without UDSF for the first interaction with UDM. The UDM uses this attribute to do an NRF query in order to invoke later services in a backup AMF, e.g. Namf_EventExposure. |
| urrpIndicator | boolean | O | 0 . . . 1 | This IE indicates whether UE reachability for this user has been subscribed or not: True: Reachability event for this user has been subscribed False: Reachability event for this user has not been subscribed yet or although has been subscribed before but now it is un-subscribed |

Optional attributes of this type that are also attributes of the derived type Amf3GppAccessRegistrationModification (see clause 6.2.6.2.7) shall not be marked with "nullable: true" in the OpenAPI file.

The subscriber list can be added in for example, CreatedEeSubscription. Below is an example of the Amf3GppAccessRegistratio modified according to the present disclosure, where the field in bold is an example of the subscriber list.

TABLE 7

Definition of type CreatedEeSubscription

| Attribute name | Data type | P | Cardinality | Description |
|---|---|---|---|---|
| eeSubscription | EeSubscription | M | 1 | This IE shall contain the representation of the created event subscription. |
| numberOfUes | Uinteger | C | 0 . . . 1 | This IE shall be includ This IE shall contain the representation of the created event subscription.ed if the event subscription is for a group of Ues. When present, this IE shall represent the number of Ues in the group. |
| eventtReports | array(MonitoringReport) | O | 0 . . . N | This IE when present, shall contain the status of events that are requested for immediate reporting as well, if those events are available at the time of subscription. |
| eeSubscribers | Array(NfInstanceId) | O | 1 . . . N | This IE shall contain the event subscriber list of the created common event subscription. |

The UE reachability is given as an example event to be subscribed in FIG. 7. The event in the present disclosure is not limited to thereto. As another example, the event may be any of those listed in Table 4.

Figure 8:
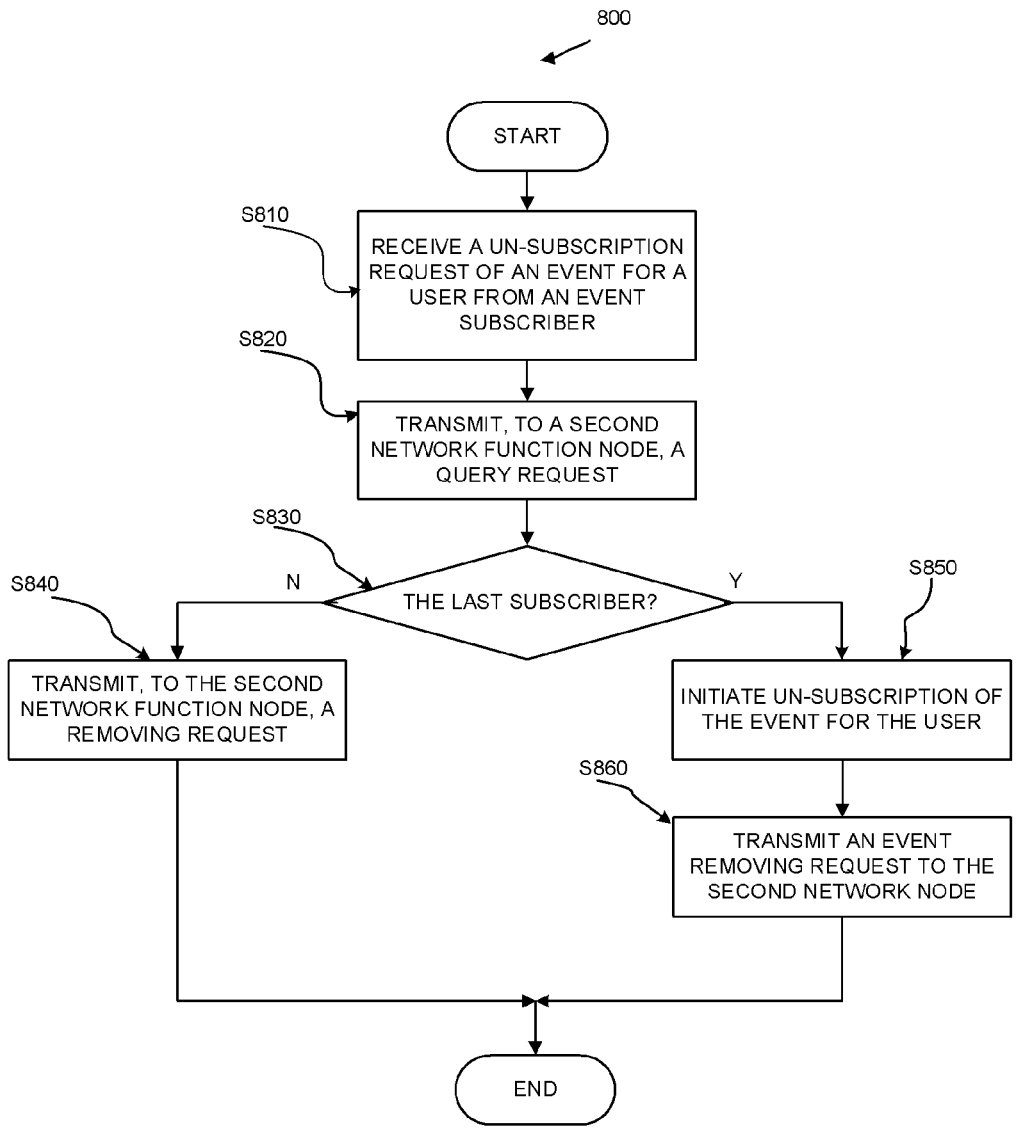
FIG. 8 illustratively shows a flowchart of a method for managing event un-subscription according to an exemplary embodiment of the present disclosure.

FIG. 8 illustratively shows a flowchart of a method 800 for managing event un-subscription according to an exemplary embodiment of the present disclosure. In an embodiment, the method 800 may be performed at a first network function node.

As shown in FIG. 8, the method 800 may include Steps S810~S830.

In Step S810, an un-subscription request of an event for a user is received from an event subscriber to un-subscribe the event. In response to the receipt of the subscription request, the method proceeds to step S820, in which the first network function node transmits, to a second network function node, a query request for querying whether the event subscriber is a last subscriber for the event of the user in a subscriber list of the event for the user. The query request may include identification information of the event subscriber. In response to the querying, the first network function node receives a response to the query request from the second network function node at step S830. An example of Step S810, S820 and S830 is Step S1002, S1004 and S1008 shown in FIG. 10.

If the response to the query request from the second network function node indicates that the event subscriber is not the last subscriber for the event of the user, the method proceeds to step S840, in which the first network function node transmits, to the second network function node, a removing request for removing, by the second network function node, the event subscriber from the subscriber list of the event for the user. In an exemplary embodiment of the present disclosure, the removing request may include identification information of the event subscriber. An example of Step S840 is Step S1010 shown in FIG. 10.

If the response to the query request from the second network function node indicates that the event subscriber is the last subscriber for the event of the user, the method proceeds to step S850, in which the first network function node initiates un-subscription of the event for the user with a serving node. If the un-subscription of the event for the user with a serving node is successful, then at step S860, the first network function node transmits, to the second network function node, an event removing request for removing the subscriber list by the second network function node. An example of Step S850 and S860 is Step S1022 and S1026 shown in FIG. 10.

Please note that the terms "removing request" and "event removing request" as used above are named for differentiating the two requests but not for additionally limiting the meaning or scope of the description reciting these terms.

In an exemplary embodiment of the present disclosure, the first network function node may be one of a Unified Data Management (UDM), a Network Exposure Function (NEF), and an Access and Mobility Management Function (AMF).

In an exemplary embodiment of the present disclosure, the second network function node is a Unified Data Repository (UDR).

According to the embodiment of the present disclosure, the first network function node, when receiving a un-subscription request of an event for a user from an event subscriber, checks with the second network function node whether the event subscriber is the last subscriber for the event of the user. If the event subscriber is not the last subscriber for the event of the user, the first network function node will transmit a request, for example a removing request, with identification information of the event subscriber to the second network function node, which will remove the event subscriber from the subscriber list of the event for the user. At that time, the first network function node knows that there is still at least one event subscriber for the event of the user since that requesting event subscriber is not the last one, and so no un-subscription of the event for the user with a serving node will be initiated. Thereafter, when the first network function node receives a un-subscription request of an event for a user from an event subscriber, it checks with the second network function node whether the event subscriber is the last subscriber for the event of the user. If the event subscriber is the last subscriber for the event of the user, the first network function node will transmit a request, for example an event removing request, to the second network function node, which will remove the subscriber list of the event for the user. At that time, the first network function node knows that there is no more event subscriber for the event of the user since that requesting event subscriber is the last one, and so it initiates un-subscription of the event for the user with a serving node to un-subscribe the event. According to the embodiment of the present disclosure, un-subscription of an event from a specific event subscriber doesn't impact the subscription of the same event by others. It is just a removal of the event subscriber from the subscriber list. Only when it is the last one in the subscriber list, an un-subscription of the event is transmitted to the serving node.

Figure 9:
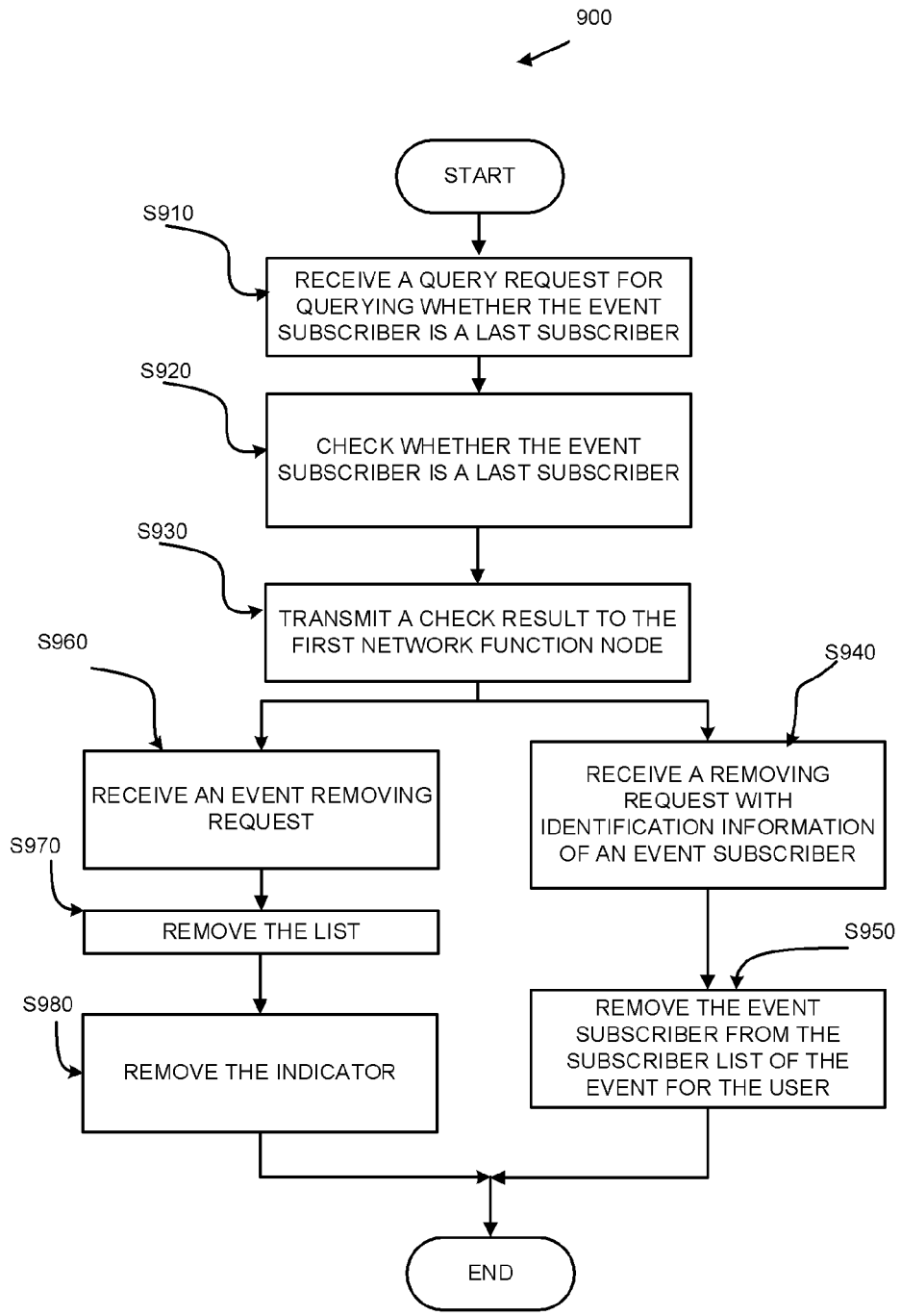
FIG. 9 illustratively shows a flowchart of a method for managing event un-subscription according to an exemplary embodiment of the present disclosure.

FIG. 9 illustratively shows a flowchart of a method 900 for managing event un-subscription according to an exemplary embodiment of the present disclosure. In an embodiment, the method 900 may be performed at a second network function node.

As shown in FIG. 9, the method 900 may include Steps S910~S930.

In Step S910, the second network function node receives a query request for an event subscriber to un-subscribe an event for a user, from a first network function node for querying whether the event subscriber is a last subscriber for the event of the user in a subscriber list of the event for the user. The query request may include identification information of the event subscriber. In response to reception of the query request, the method proceeds to step S920, in which the second network function node checks whether the event subscriber is the last subscriber in the subscriber list of the event for the user. Then, the method proceeds to step S930, in which the second network function node transmits a check result to the first network function node. An example of Step S910, S920 and S930 is Step S1002, S1006 and S1008 shown in FIG. 10.

In response to the transmission of the check result to the first network function node, the method 900 may also include Step S940, in which the second network function node receives a removing request from the first network function node for removing the event subscriber from the subscriber list of the event for the user. In response to reception of the removing request, the method proceeds to step S950, in which the second network function node removes the event subscriber from the subscriber list of the event for the user. In an exemplary embodiment of the present disclosure, the removing request may include identification information of the event subscriber to un-subscribe the event. An example of Step S940 and S950 is Step S1010 and S1012 shown in FIG. 10.

The method 900 may also include step S960, in which the second network function node receives an event removing request for removing the subscriber list from the first network function node. In response to reception of the event removing request, the method proceeds to step S970, in which the second network function node removes the subscriber list of the event for the user, and in step S980, the second network function node removes an indicator indicating the event of the user has been subscribed. Please note that the steps in FIG. 9 are exemplified in the order as shown. Some steps such as S970 and S980 may be performed in a different order, e.g. in parallel or in a reverse order. An example of Step S960, S970 and S980 is Step S1026 and S1028 shown in FIG. 10.

In an exemplary embodiment of the present disclosure, the step S970 of removing the subscriber list comprises removing the subscriber list from a table stored in the second network function node that describes subscription of the event for the user.

In an exemplary embodiment of the present disclosure, the step S980 of removing the indicator comprises removing the indicator from a table stored in the second network function node that describes event subscription of the user.

In an exemplary embodiment of the present disclosure, the first network function node is one of a Unified Data Management (UDM), a Network Exposure Function (NEF), and an Access and Mobility Management Function (AMF).

In an exemplary embodiment of the present disclosure, the second network function node is a Unified Data Repository (UDR).

According to the embodiment of the present disclosure, the second network function node, when receiving a query request from a first network function node for querying whether the event subscriber is a last subscriber for the event of the user in a subscriber list of the event for the user, looks into the subscriber list of the event for the user to determine whether the event subscriber is a last subscriber for the event of the user. The second network function then transmits its check result to the first network function node. If the event subscriber is not the last subscriber for the event of the user, the first network function node will transmit a request, for example a removing request, with identification information of the event subscriber to the second network function node. Upon receiving the removing request, the second network function node will remove the event subscriber from the subscriber list of the event for the user. At that time, the first network function node knows that there is still at least one event subscriber for the event of the user since that requesting event subscriber is not the last one, and so no un-subscription of the event for the user with a serving node will be initiated. Thereafter, when the second network function node receives a query request from a first network function node for querying whether the event subscriber is a last subscriber for the event of the user in a subscriber list of the event for the user, it looks into the subscriber list of the event for the user to determine whether the event subscriber is a last subscriber for the event of the user. The second network function then transmits its check result to the first network function node. If the event subscriber is the last subscriber for the event of the user, the first network function node will transmit a request, for example an event removing request, to the second network function node. Upon receiving the event removing request, the second network function node will remove the subscriber list of the event for the user. At that time, the first network function node knows that there is no more event subscriber for the event of the user since that requesting event subscriber is the last one, and so it initiates un-subscription of the event for the user with a serving node to un-subscribe the event. According to the embodiment of the present disclosure, un-subscription of an event from a specific event subscriber doesn't impact the subscription of the same event by others. It is just a removal of the event subscriber from the subscriber list. Only when it is the last one in the subscriber list, an un-subscription of the event is transmitted to the serving node.

Figure 10:
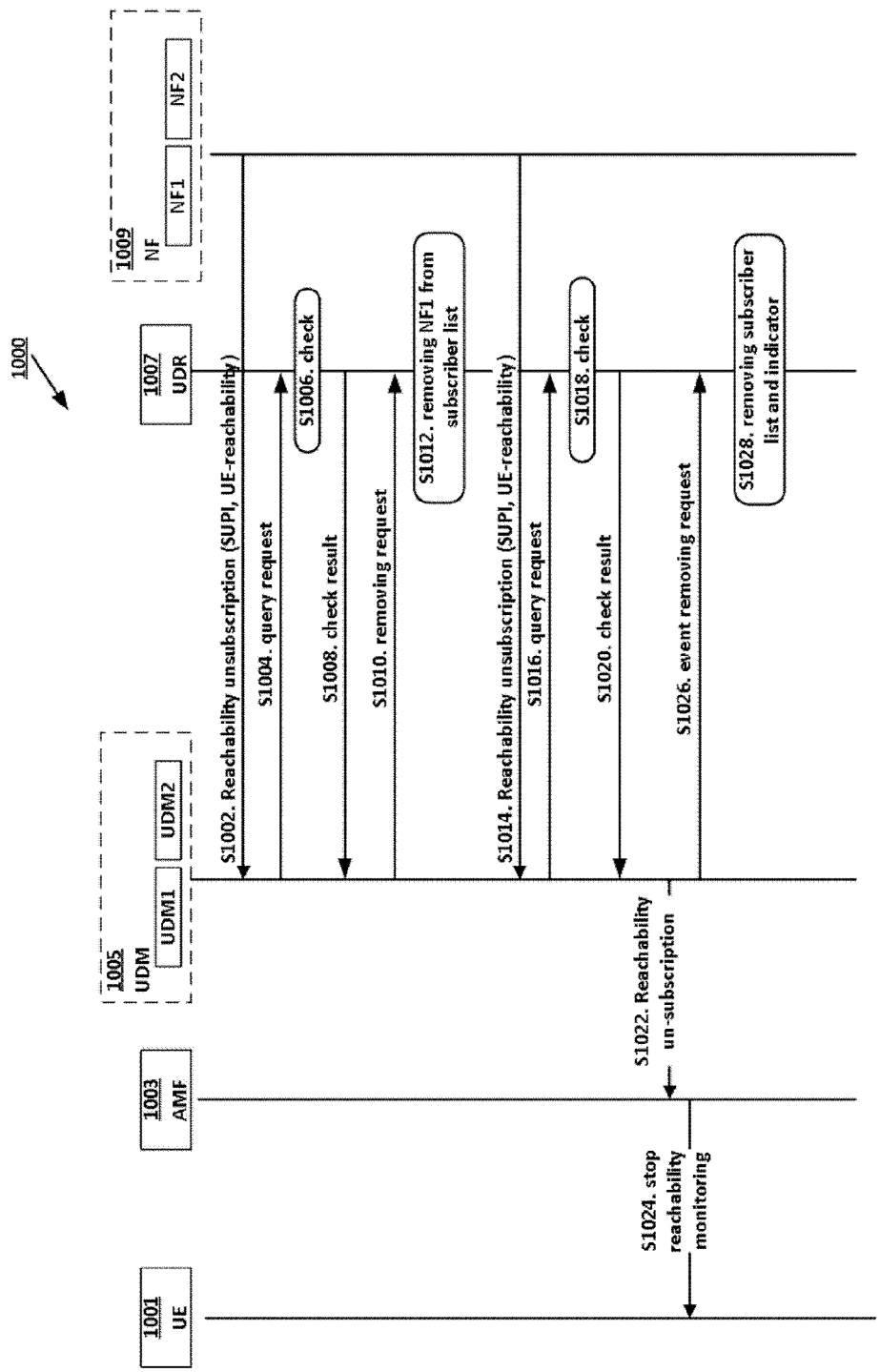
FIG. 10 shows an exemplifying signaling diagram illustrating details of the methods schematically illustrated in FIGS. 8 and 9.

FIG. 10 shows an exemplifying signaling diagram 1000 illustrating details of the methods schematically illustrated in FIGS. 8 and 9.

The example shown in FIG. 10 involves a UE 1001, an AMF 1003, a list of UDMs 1005, a UDR 1007 and a list of NF 1009. It is shown that the list of UDMs 1005 includes two UDM, UDM1 and UDM2, and the list of NF 1009 includes two NF, NF1 and NF2. It is only an example and the present disclosure is not limited thereto.

When NF1 initiates un-subscription of UE reachability for a certain user (SUPI=xxx), one of UDM instance such as UDM1 is selected based on e.g., load balancing rules. UDM1 receives the reachability un-subscription from NF1 (S1002).

UDM1 transmits a query request to UDR 1007 (S1004) for querying whether NF1 is the last subscriber for the reachability of the user.

UDR 1007 then checks whether NF1 is the last subscriber for the reachability of the user (S1006). In the example, it is assumed that the NF1 and NF2 have subscribed for the UE reachability of the user. Therefore, NF1 is not the last for the reachability of the user.

UDR 1007 then transmits its check result to UDM1 (S1008).

Upon receiving the response from UDR 1007 indicating NF1 is not the last subscriber for the reachability of the user, UDM1 transmits a removing request to UDR 1007 (S1010) along with identity of NF1, which is the event subscriber that requests to un-subscribe the reachability.

Upon receiving the removing request, UDR 1007 removes NF1 from the subscriber list (S1012). In the example, now only NF2 is left in the subscriber list.

At the time, UDM 1005 will not initiate the reachability un-subscription to a serving node that provides notification on the UE reachability, i.e., AMF 1003 in the example. AMF 1003 continues monitoring UE reachability since NF2 subscribes the event.

When NF2 initiates UE reachability un-subscription for the same user (SUPI=xxx), one of UDM instance such as UDM2 is selected based on e.g., load balancing rules. UDM2 receives the reachability un-subscription from NF2 (S1014).

UDM2 transmits a query request to UDR 1007 (S1016) for querying whether NF2 is the last subscriber for the reachability of the user.

UDR 1007 then checks whether NF2 is the last subscriber for the reachability of the user (S1018). In the example, NF2 is the last for the reachability of the user.

UDR 1007 then transmits its check result to UDM1 (S1020).

Upon receiving the response from UDR 1007 indicating NF2 is the last subscriber for the reachability of the user, UDM1 initiates the reachability un-subscription to the serving node, in this case it is AMF 1003 (S1022). AMF 1003 stops monitoring of UE reachability of the user (S1024).

Upon reception of acknowledgement of the un-subscription is successful, UDM1 transmits an event removing request to UDR 1007 (S1026).

Upon receiving the event removing request, UDR 1007 removes the subscriber list and an indicator indicating the reachability of the user has been subscribed (S1028).

Figure 11:
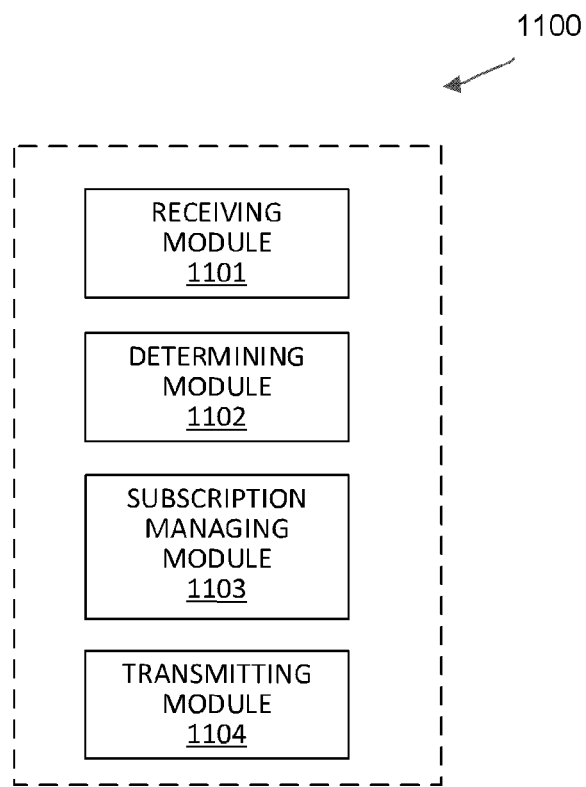
FIG. 11 illustratively shows a schematic structure diagram of a first NF node according to an exemplary embodiment of the present disclosure.

Hereinafter, a structure of a first NF node will be described with reference to FIG. 11. FIG. 11 illustratively shows a schematic structure diagram of a first NF node 1100 (e.g. UDM 705 as shown in FIG. 7 and/or UDM 1007 as shown in FIG. 10, as described previously) according to an exemplary embodiment of the present disclosure. The first NF node 1100 in FIG. 11 may perform the method 500 for event subscription management described previously with reference to FIG. 5 and/or the method 800 for event un-subscription management described previously with reference to FIG. 8. Accordingly, some detailed description on the first NF node 1100 may refer to the corresponding description of the method 500 for event subscription management and/or the corresponding description of the method 800 for event un-subscription management as previously discussed.

As shown in FIG. 11, the first NF node 1100 may include a receiving module 1101, a determining module 1102, a subscription managing module 1103 and a transmitting module 1104. As will be understood by the skilled in the art, common components in the first NF node 1100 are omitted in FIG. 11 for not obscuring the idea of the present disclosure. Also, some modules may be distributed in more modules or integrated into fewer modules. For example, the receiving module 1101 and the transmitting module 1104 may be integrated into a transceiver module.

In an exemplary embodiment of the present disclosure, the receiving module 1101 of the first NF node 1100 may be configured to receive a subscription request of an event for a user from an event subscriber. The transmitting module 1104 of the first NF node 1100 may be configured to transmit, in response to receipt of the subscription request, a query request for querying whether the event for the user has been subscribed to a second network function node. The receiving module 1101 of the first NF node 1100 may be configured to receive a response to the query request from the second network function node. The determining module 1102 of the first NF node 1100 may be configured to determine whether the event for the user has been subscribed based on the response. If it is determined that the event for the user has been subscribed, the transmitting module 1104 of the first NF node 1100 may be configured to transmit an updating request to the second network function node. The updating request may include identification information of the event subscriber. If it is determined that the event for the user has not been subscribed, the transmitting module 1104 of the first NF node 1100 may be configured to transmit, to the second network function node, a creating request with identification information of the event subscriber for creating the subscriber list for the event of the user, and the subscription managing module 1103 of the first NF node 1100 may be configured to initiate subscription of the event for the user with a serving node.

In another exemplary embodiment of the present disclosure, the receiving module 1101 of the first NF node 1100 may be further configured to receive an un-subscription request of an event for a user from an event subscriber. The transmitting module 1104 of the first NF node 1100 may be configured to transmit to a second network function node, in response to receipt of the un-subscription request, a query request for querying whether the event subscriber is a last subscriber for the event of the user in a subscriber list of the event for the user. The query request may include identification information of the event subscriber. The receiving module 1101 of the first NF node 1100 may be configured to receive a response to the query request from the second network function node. The determining module 1102 of the first NF node 1100 may be configured to determine whether the event subscriber is not the last subscriber based on the response. If it is determined that the event subscriber is not the last subscriber, the transmitting module 1104 of the first NF node 1100 may be configured to transmit, to the second network function node, a removing request for removing, by the second network function node, the event subscriber from the subscriber list of the event for the user. If it is determined that the event subscriber is the last subscriber for the event of the user, the transmitting module 1104 of the first NF node 1100 may be configured to transmit, to the second network function node, an event removing request to the second network function node for removing the subscriber list by the second network function node, and the subscription managing module 1103 of the first NF node 1100 may be configured to initiate un-subscription of the event for the user with a serving node.

In an exemplary embodiment of the present disclosure, the first network function node is one of a Unified Data Management (UDM), a Network Exposure Function (NEF), and an Access and Mobility Management Function (AMF). In an exemplary embodiment of the present disclosure, the second network function node is a Unified Data Repository (UDR).

Figure 12:
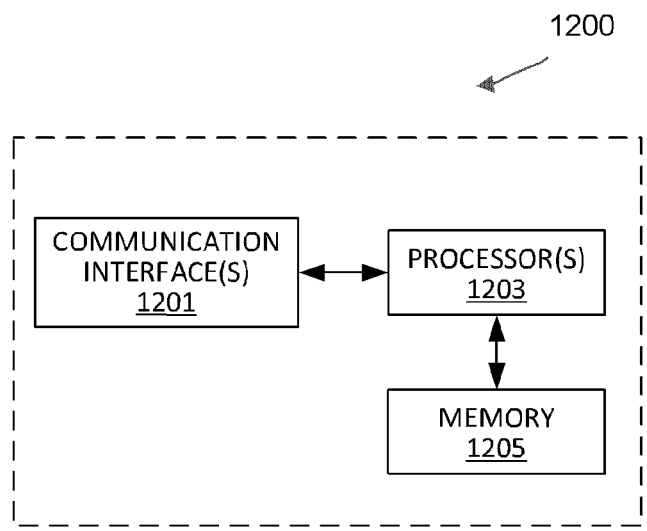
FIG. 12 illustratively shows a schematic structure diagram of a first NF node according to an exemplary embodiment of the present disclosure.

Hereinafter, another structure of a first NF node 1200 will be described with reference to FIG. 12. FIG. 12 illustratively shows a schematic structure diagram of a first NF node 1200 (e.g., UDM 705 as shown in FIG. 7 and/or UDM 1005 as shown in FIG. 10, as described previously) according to an exemplary embodiment of the present disclosure. The first NF node 1200 in FIG. 12 may perform the method 500 for event subscription management described previously with reference to FIG. 5 and/or the method 800 for event un-subscription management described previously with reference to FIG. 8. Accordingly, some detailed description on the first NF node 1200 may refer to the corresponding description of the method 500 for event subscription management and/or the corresponding description of the method 800 for event un-subscription management as previously discussed.

As shown in FIG. 12, the first NF node 1200 may include at least one controller or processor 1203 including e.g., any suitable Central Processing Unit, CPU, microcontroller, Digital Signal Processor, DSP, etc., capable of executing computer program instructions. The computer program instructions may be stored in a memory 1205. The memory 1205 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary first NF node 1200 further comprises a communication interface 1201 arranged for communication.

The instructions, when loaded from the memory 1205 and executed by the at least one processor 1203, may cause the first NF node 1200 to perform the method 500 for event subscription management and/or the method 800 for event un-subscription management as previously discussed.

In particular, in an exemplary embodiment of the present disclosure, the instructions, when loaded from the memory 1205 and executed by the at least one processor 1203, may cause the first NF node 1200 to receive a subscription request of an event for a user from an event subscriber.

In response to receipt of the subscription request, the instructions, when loaded from the memory 1205 and executed by the at least one processor 1203, may cause the first NF node 1200 to transmit a query request for querying whether the event for the user has been subscribed to a second network function node.

The instructions, when loaded from the memory 1205 and executed by the at least one processor 1203, may cause the first NF node 1200 to receive a response to the query request from the second network function node.

If the response to the query request from the second network function node indicates that the event for the user has been subscribed, the instructions, when loaded from the memory 1205 and executed by the at least one processor 1203, may cause the first NF node 1200 to transmit an updating request to the second network function node. The updating request may include identification information of the event subscriber. If the response to the query request from the second network function node indicates that the event for the user has not been subscribed, the instructions, when loaded from the memory 1205 and executed by the at least one processor 1203, may cause the first NF node 1200 to transmit, to the second network function node, a creating request with identification information of the event subscriber for creating the subscriber list for the event of the user, to initiate subscription of the event for the user with a serving node.

In another exemplary embodiment of the present disclosure, the instructions, when loaded from the memory 1205 and executed by the at least one processor 1203, may cause the first NF node 1200 to receive an un-subscription request of an event for a user from an event subscriber.

In response to receipt of the un-subscription request, the instructions, when loaded from the memory 1205 and executed by the at least one processor 1203, may cause the first NF node 1200 to transmit to a second network function node a query request to un-subscribe the event, for querying whether the event subscriber is a last subscriber for the event of the user in a subscriber list of the event for the user. The query request may include identification information of the event subscriber.

The instructions, when loaded from the memory 1205 and executed by the at least one processor 1203, may cause the first NF node 1200 to receive a response to the query request from the second network function node.

If the response to the query request from the second network function node indicates that the event subscriber is not the last subscriber for the event of the user, the instructions, when loaded from the memory 1205 and executed by the at least one processor 1203, may cause the first NF node 1200 to transmit, to the second network function node, a removing request for removing, by the second network function node, the event subscriber from the subscriber list of the event for the user.

If the response to the query request from the second network function node indicates that the event subscriber is the last subscriber for the event of the user, the instructions, when loaded from the memory 1205 and executed by the at least one processor 1203, may cause the first NF node 1200 to transmit, to the second network function node, an event removing request to the second network function node for removing the subscriber list by the second network function node, and to initiate un-subscription of the event for the user with a serving node.

Figure 13:
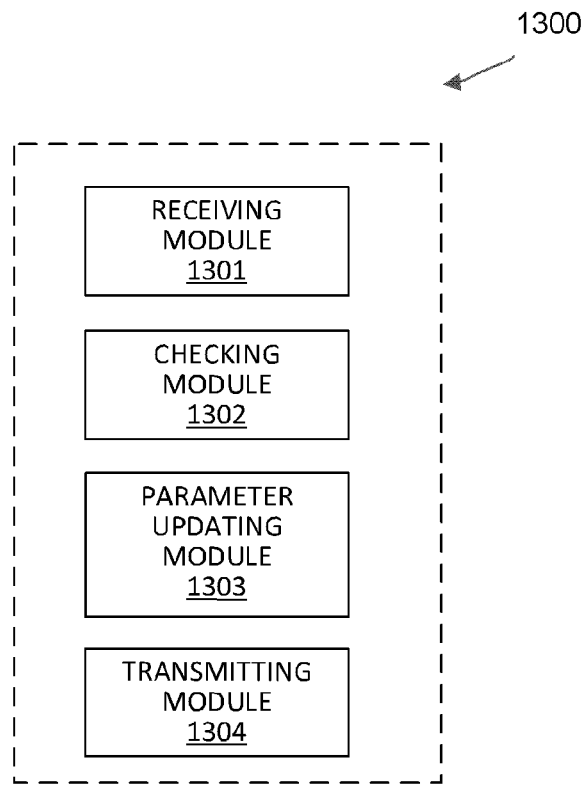
FIG. 13 illustratively shows a schematic structure diagram of a second NF node according to an exemplary embodiment of the present disclosure.

Hereinafter, a structure of a second NF node will be described with reference to FIG. 13. FIG. 13 illustratively shows a schematic structure diagram of a second NF node 1300 (e.g. UDR 707 as shown in FIG. 7 and UDR 1007 as shown in FIG. 10, as described previously) according to an exemplary embodiment of the present disclosure. The second NF node 1300 in FIG. 13 may perform the method 600 for event subscription management described previously with reference to FIG. 6 and/or the method 900 for event un-subscription management described previously with reference to FIG. 9. Accordingly, some detailed description on the second NF node 1300 may refer to the corresponding description of the method 600 for event subscription management and/or the corresponding description of the method 900 for event un-subscription management as previously discussed.

As shown in FIG. 13, the second NF node 1300 may include a receiving module 1301, a checking module 1302, a parameter updating module 1303 and a transmitting module 1304. As will be understood by the skilled in the art, common components in the second NF node 1300 are omitted in FIG. 13 for not obscuring the idea of the present disclosure. Also, some modules may be distributed in more modules or integrated into fewer modules. For example, the receiving module 1301 and the transmitting module 1304 may be integrated into a transceiver module.

In an exemplary embodiment of the present disclosure, the receiving module 1301 of the second NF node 1300 may be configured to receive a query request from a first network function node for querying whether an event for a user has been subscribed. In response to reception of the query request, the checking module 1302 of the second NF node 1300 may be configured to check whether an indicator indicating the event for the user has been subscribed has been set. The transmitting module 1304 of the second NF node 1300 may be configured to transmit a check result to the first network function node.

In an exemplary embodiment of the present disclosure, the receiving module 1301 of the second NF node 1300 may be configured to receive an updating request for updating a subscriber list of the event for the user with an event subscriber to the event from the first network function node. The updating request may include identification information of the event subscriber. In response to reception of the updating request, the parameter updating module 1303 of the second NF node 1300 may be configured to update a subscriber list of the event for the user to include the event subscriber.

In an exemplary embodiment of the present disclosure, the receiving module 1301 of the second NF node 1300 may be configured to receive a creating request with identification information of the event subscriber to subscribe the event for the user from the first network function node. In response to reception of the creating request, the parameter updating module 1303 of the second NF node 1300 may be configured to set the indicator and create the subscriber list of the event for the user and include the event subscriber into the subscriber list of the event for the user. In an exemplary embodiment of the present disclosure, the parameter updating module 1303 of the second NF node 1300 may be configured to set the indicator in a table stored in the second network function node that describes event subscription of the user, and create the subscriber list in a table stored in the second network function node that describes subscription of the event for the user.

In another exemplary embodiment of the present disclosure, the receiving module 1301 of the second NF node 1100 may be configured to receive a query request for an event subscriber to un-subscribe an event for a user, from a first network function node for querying whether the event subscriber is a last subscriber for the event of the user in a subscriber list of the event for the user. The query request may include identification information of the event subscriber. In response to reception of the query request, the checking module 1302 of the second NF node 1300 may be configured to check whether the event subscriber is the last subscriber in the subscriber list of the event for the user. The transmitting module 1304 of the second NF node 1300 may be configured to transmit a check result to the first network function node.

In an exemplary embodiment of the present disclosure, the receiving module 1301 of the second NF node 1300 may be configured to receive a removing request from the first network function node for removing the event subscriber from the subscriber list of the event for the user. In response to reception of the removing request, the parameter updating module 1303 of the second NF node 1300 may be configured to remove the event subscriber from the subscriber list of the event for the user.

In an exemplary embodiment of the present disclosure, the receiving module 1301 of the second NF node 1300 may be configured to receive an event removing request for removing the subscriber list from the first network function node. In response to reception of the event removing request, the parameter updating module 1303 of the second NF node 1300 may be configured to remove the subscriber list of the event for the user. In response to reception of the event removing request, the parameter updating module 1303 of the second NF node 1300 may be further configured to remove an indicator indicating the event of the user has been subscribed. In an exemplary embodiment of the present disclosure, the parameter updating module 1303 of the second NF node 1300 may be configured to remove the indicator from a table stored in the second network function node that describes event subscription of the user, and remove the subscriber list from a table stored in the second network function node that describes subscription of the event for the user.

Figure 14:
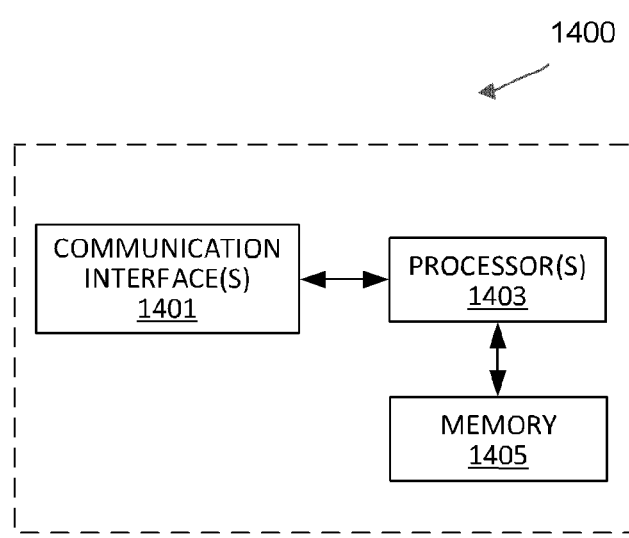
FIG. 14 illustratively shows a schematic structure diagram of a second NF node according to an exemplary embodiment of the present disclosure.

Hereinafter, another structure of a second NF node will be described with reference to FIG. 14. FIG. 14 illustratively shows a schematic structure diagram of a second NF node 1400 (e.g., UDR 707 as shown in FIG. 7 and UDR 1007 as shown in FIG. 10, as described previously) according to an exemplary embodiment of the present disclosure. The second NF node 1400 in FIG. 14 may perform the method 600 for event subscription management described previously with reference to FIG. 6 and/or the method 900 for event un-subscription management described previously with reference to FIG. 9. Accordingly, some detailed description on the second NF node 1400 may refer to the corresponding description of the method 600 for event subscription management and/or the corresponding description of the method 900 for event un-subscription management as previously discussed.

As shown in FIG. 14, the second NF node 1400 may include at least one controller or processor 1403 including e.g., any suitable Central Processing Unit, CPU, microcontroller, Digital Signal Processor, DSP, etc., capable of executing computer program instructions. The computer program instructions may be stored in a memory 1405. The memory 1405 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary second NF node 1400 further comprises a communication interface 1401 arranged for communication.

The instructions, when loaded from the memory 1405 and executed by the at least one processor 1403, may cause the second NF node 1400 to perform the method 600 for event subscription management described previously with reference to FIG. 6 and/or the method 900 for event un-subscription management described previously with reference to FIG. 9.

In particular, in an exemplary embodiment of the present disclosure, the instructions, when loaded from the memory 1405 and executed by the at least one processor 1403, may cause the second NF node 1400 to receive a query request from a first network function node for querying whether an event for a user has been subscribed.

In response to reception of the query request, the instructions, when loaded from the memory 1405 and executed by the at least one processor 1403, may cause the second NF node 1400 to check whether an indicator indicating the event for the user has been subscribed has been set.

The instructions, when loaded from the memory 1405 and executed by the at least one processor 1403, may cause the second NF node 1400 to transmit a check result to the first network function node.

In an exemplary embodiment of the present disclosure, the instructions, when loaded from the memory 1405 and executed by the at least one processor 1403, may cause the second NF node 1400 to receive an updating request for updating a subscriber list of the event for the user with an event subscriber to the event from the first network function node. The updating request may include identification information of the event subscriber. In response to reception of the updating request, the instructions, when loaded from the memory 1405 and executed by the at least one processor 1403, may cause the second NF node 1400 to update a subscriber list of the event for the user to include the event subscriber.

In an exemplary embodiment of the present disclosure, the instructions, when loaded from the memory 1405 and executed by the at least one processor 1403, may cause the second NF node 1400 to receive a creating request with identification information of the event subscriber to subscribe the event for the user from the first network function node. In response to reception of the creating request, the instructions, when loaded from the memory 1405 and executed by the at least one processor 1403, may cause the second NF node 1400 to set the indicator and create the subscriber list of the event for the user and include the event subscriber into the subscriber list of the event for the user. In an exemplary embodiment of the present disclosure, the instructions, when loaded from the memory 1405 and executed by the at least one processor 1403, may cause the second NF node 1400 to set the indicator in a table stored in the second network function node that describes event subscription of the user, and create the subscriber list in a table stored in the second network function node that describes subscription of the event for the user.

In another exemplary embodiment of the present disclosure, the instructions, when loaded from the memory 1405 and executed by the at least one processor 1403, may cause the second NF node 1400 to receive a query request for an event subscriber to un-subscribe an event for a user, from a first network function node for querying whether the event subscriber is a last subscriber for the event of the user in a subscriber list of the event for the user. In response to reception of the query request, the instructions, when loaded from the memory 1405 and executed by the at least one processor 1403, may cause the second NF node 1400 to check whether the event subscriber is the last subscriber in the subscriber list of the event for the user. The instructions, when loaded from the memory 1405 and executed by the at least one processor 1403, may cause the second NF node 1400 to transmit a check result to the first network function node.

In an exemplary embodiment of the present disclosure, the instructions, when loaded from the memory 1405 and executed by the at least one processor 1403, may cause the second NF node 1400 to receive a removing request from the first network function node for removing the event subscriber from the subscriber list of the event for the user. In response to reception of the removing request, the instructions, when loaded from the memory 1405 and executed by the at least one processor 1403, may cause the second NF node 1400 to remove the event subscriber from the subscriber list of the event for the user.

In an exemplary embodiment of the present disclosure, the instructions, when loaded from the memory 1405 and executed by the at least one processor 1403, may cause the second NF node 1400 to receive an event removing request for removing the subscriber list from the first network function node. In response to reception of the event removing request, the instructions, when loaded from the memory 1405 and executed by the at least one processor 1403, may cause the second NF node 1400 to remove the subscriber list of the event for the user. In response to reception of the event removing request, the instructions, when loaded from the memory 1405 and executed by the at least one processor 1403, may cause the second NF node 1400 to remove an indicator indicating the event of the user has been subscribed. In an exemplary embodiment of the present disclosure, the instructions, when loaded from the memory 1405 and executed by the at least one processor 1403, may cause the second NF node 1400 to remove the indicator from a table stored in the second network function node that describes event subscription of the user, and remove the subscriber list from a table stored in the second network function node that describes subscription of the event for the user.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method implemented at a first network function node for managing event subscription, comprising:
   receiving a subscription request of an event for a user from an event subscriber,
   in response to receipt of the subscription request, transmitting, to a second network function node, a query request for querying whether the event for the user has been subscribed;
   if a response to the query request from the second network function node indicates that the event for the user has not been subscribed, initiating subscription of the event for the user with a serving node; and
   upon reception of acknowledgement that the subscription of the event is successful, setting an indicator in the second network function node to indicate that the event for the user has been subscribed.

2. The method of claim 1, further comprising:
   transmitting an updating request to the second network function node if the response to the query request from the second network function node indicates that the event for the user has been subscribed.

3. The method of claim 1 wherein the first network function node is a Unified Data Management (UDM), and the serving node is an Access and Mobility Management Function (AMF).

4. The method of claim 1, wherein the second network function node is a Unified Data Repository (UDR).

5. A method implemented at a second network function node for managing event subscription, comprising:
   receiving a query request from a first network function node for querying whether an event for a user has been subscribed,
   in response to reception of the query request,
   transmitting a query response including a check result indicating whether the event for the user has been subscribed to the first network function node, and
   setting an indicator to indicate that the event for the user has been subscribed upon reception of a request for setting the indicator from the first network function node.

6. The method of claim 5, wherein the indicator is set in a table stored in the second network function node that describes event subscription of the user.

7. The method of claim 5, wherein the first network function node is a Unified Data Management (UDM).

8. The method of claim 5, wherein the second network function node is a Unified Data Repository (UDR).

9. An apparatus for managing event subscription, comprising a processing circuitry configured to:
   receive a subscription request of an event for a user from an event subscriber;
   in response to receipt of the subscription request, transmit, to a second network function node, a query request for querying whether the event for the user has been subscribed;
   if a response to the query request from the second network function node indicates that the event for the user has not been subscribed, initiate subscription of the event for the user with a serving node; and upon reception of acknowledgement that the subscription of the event is successful, set an indicator in the second network function node to indicate that the event for the user has been subscribed.

10. The apparatus of claim 9, wherein the processing circuitry is further configured to:

transmit an updating request to the second network function node if the response to the query request from the second network function node indicates that the event for the user has been subscribed.

11. The apparatus of claim 9, wherein the first network function node is a Unified Data Management (UDM), and the serving node is an Access and Mobility Management Function (AMF).

12. The apparatus of claim 9, wherein the second network function node is a Unified Data Repository (UDR).

13. An apparatus for managing event subscription, comprising a processing circuitry configured to:

receive a query request from a first network function node for querying whether an event for a user has been subscribed, in response to reception of the query request, transmitting a query response including a check result indicating whether the event for the user has been subscribed to the first network function node, and setting an indicator to indicate that the event for the user has been subscribed upon reception of a request for setting the indicator from the first network function node.

14. The apparatus of claim 13, wherein the indicator is set in a table stored in the second network function node that describes event subscription of the user.

15. The apparatus of claim 13, wherein the first network function node is a Unified Data Management (UDM).

16. The apparatus of claim 13, wherein the second network function node is a Unified Data Repository (UDR).

* * * * *

UNITED STATES PATENT AND TRADEMARK OFFICE
CERTIFICATE OF CORRECTION

| | |
|---|---|
| PATENT NO. | : 12,035,411 B2 |
| APPLICATION NO. | : 18/450531 |
| DATED | : July 9, 2024 |
| INVENTOR(S) | : Hongxia Long |

It is certified that error appears in the above-identified patent and that said Letters Patent is hereby corrected as shown below:

On the Title Page

On Page 2, item [56], in Column 2, Line 7, delete "Tsg: Sa WG2" and insert -- TSG: SA WG2 --, therefor.

On Page 2, item [56], in Column 2, Line 19, delete "Zhangiajie," and insert -- Zhangjiajie, --, therefor.

On Page 2, item [56], in Column 2, Line 23, delete "meeting" and insert -- Meeting --, therefor.

In the Specification

In Column 7, Line 26, delete "Node B:s" and insert -- Node Bs --, therefor.

In Column 7, Line 30, delete "(MTC/Machine-to-Machine" and insert -- (MTC)/Machine-to-Machine --, therefor.

In Column 8, Line 51, delete "Network Function Repository Function" and insert -- Network Repository Function --, therefor.

In Columns 11 & 12, in Table 5, under "Attribute name", Line 3, delete "eventtReports" and insert -- eventReports --, therefor.

In Column 14, Line 25, delete "un-necessary" and insert -- unnecessary --, therefor.

In Column 16, Line 1, delete "un-necessary" and insert -- unnecessary --, therefor.

In Column 16, Line 60, delete "un-necessary" and insert -- unnecessary --, therefor.

In Column 16, Line 61, delete "un-necessary" and insert -- unnecessary --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,035,411 B2

In Columns 17 & 18, in Table 7, under "Attribute name", Line 3, delete "eventtReports" and insert -- eventReports --, therefor.

In Column 22, Line 55, delete "UDM 1007" and insert -- UDM 1005 --, therefor.

In Column 26, Line 48, delete "node 1100" and insert -- node 1300 --, therefor.

In the Claims

In Column 30, Line 14, in Claim 1, delete "subscriber," and insert -- subscriber; --, therefor.